(12) United States Patent
Ameri et al.

(10) Patent No.: US 6,308,106 B1
(45) Date of Patent: Oct. 23, 2001

(54) FEED-FORWARD CONTROLLER WITH DELAYED COMMAND INPUT

(75) Inventors: Masoud Ameri, Independence, MN (US); Donald A. Yost, Lansdale, PA (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/243,305

(22) Filed: Feb. 2, 1999

Related U.S. Application Data

(60) Provisional application No. 60/110,290, filed on Nov. 30, 1998.

(51) Int. Cl.$^7$ ................................................. G05B 13/02
(52) U.S. Cl. ............................... 700/45; 700/42; 700/71
(58) Field of Search ............................. 700/28, 71, 40–45

(56) References Cited

U.S. PATENT DOCUMENTS

| | | | |
|---|---|---|---|
| 4,195,337 | 3/1980 | Bertrand et al. | 364/106 |
| 4,872,104 | 10/1989 | Holsinger | 364/166 |
| 5,406,474 | 4/1995 | Hansen | 364/148 |
| 5,527,238 | 6/1996 | Hrovat et al. | 477/166 |
| 5,587,896 | 12/1996 | Hansen et al. | 364/148 |
| 5,623,402 | * 4/1997 | Johnson | 700/42 |

* cited by examiner

*Primary Examiner*—Thomas M. Heckler
(74) *Attorney, Agent, or Firm*—Westman, Champlin & Kelly, P.A.; S. Koehler

(57) ABSTRACT

A system controller for a controllable system having an inherent time delay includes a delay module that receives a command input and provides a first output signal delayed in time from the command input. A feed-forward module also receives the command input, or a function thereof, and provides a second output signal intended to drive the system to a desired state. A first summer receives the delayed output signal and a feedback signal from the controllable system. The first summer combines the delayed signal and the feedback signal to provide a third output signal. A compensator module receives the third output signal and provides a fourth output signal. A second summer receives the second output signal and the fourth output signal. The second summer combines the second output signal and the fourth output signal to provide an input signal for the controllable system.

16 Claims, 9 Drawing Sheets

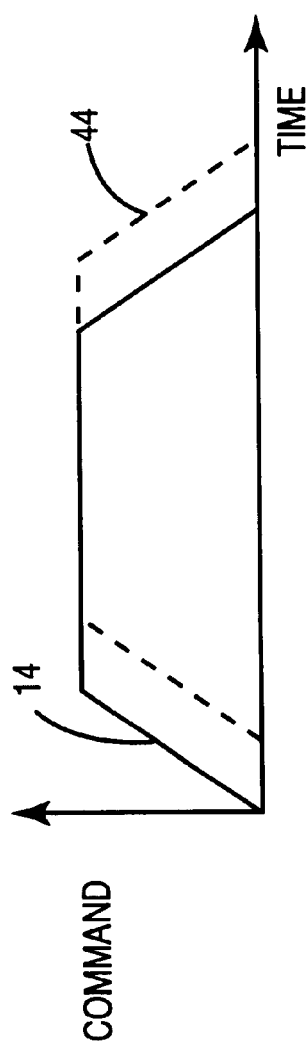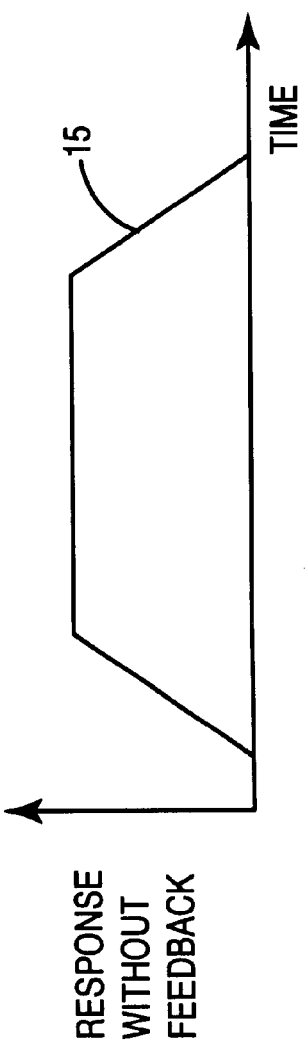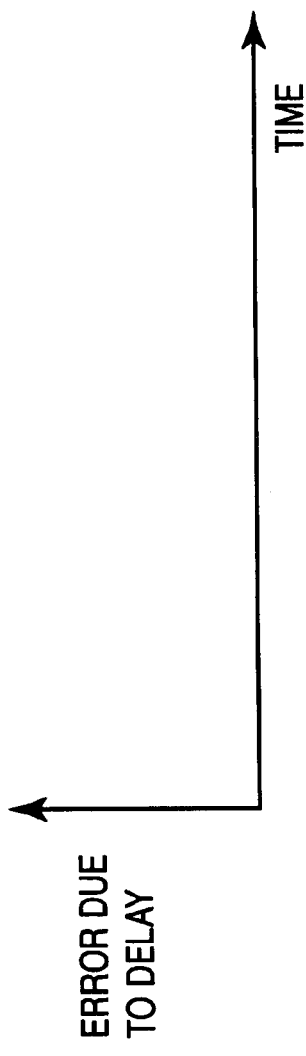

FEED-FORWARD CONTROLLER WITH DELAYED COMMAND INPUT

CROSS-REFERENCE TO RELATED APPLICATION

This application is based on and claims the benefit of U.S. provisional patent application Serial No. 60/110,290 filed Nov. 30, 1998, entitled COMMAND DERIVATIVE FEED-FORWARD, and is hereby incorporated by reference in its entirety.

BACKGROUND OF THE INVENTION

The present invention relates to the field of system controllers. More particularly, the present invention relates to system controllers for systems having an inherent delay between a command input and a system output.

It is commonly found in control systems that a phenomenon known as integrator overshoot may occur if compensators having integrators are used with systems having an inherent time delay. A typical control system will have a command input that is summed with a feedback signal to create an error signal. The error signal is applied to an input of a compensator, which usually has an integrator component to drive the error signal to zero. The output of the compensator is applied to the input of the control system. For a system with 100 percent feed-forward, an overshoot may occur following a change in the input command. In particular, due to the inherent delay of the system, an error signal provided to the compensator is generally transiently larger than that needed in order to have the system output track the command signal.

Since overshoot is typically undesirable, there is an ongoing need for a controller that can minimize or reduce the extent and/or duration of overshoot in a control system having an inherent delay.

SUMMARY OF THE INVENTION

A system controller for a controllable system having an inherent time delay includes a delay module that receives a command input and provides a first output signal delayed in time from the command input. A feed-forward module also receives the command input, or a function thereof, and provides a second output signal intended to drive the system to a desired state. A first summer receives the delayed output signal and a feedback signal from the controllable system. The first summer combines the delayed signal and the feedback signal to provide a third output signal. A compensator module receives the third output signal and provides a fourth output signal. A second summer receives the second output signal and the fourth output signal. The second summer combines the second output signal and the fourth output signal to provide an input signal for the controllable system. The modules can be implemented in hardware using conventional analog or digital components. Likewise, a processor can be provided to implement one or all of the modules as software routines.

BRIEF DESCRIPTION OF THE DRAWINGS

FIGS. 2A, 2B and 2C are graphs illustrating signals presenting in the block diagram of FIG. 1.

FIGS. 4A, 4B and 4C are graphs illustrating signals in the block diagram of FIG. 3.

DETAILED DESCRIPTION OF THE PREFERRED EMBODIMENTS

Figure 1:
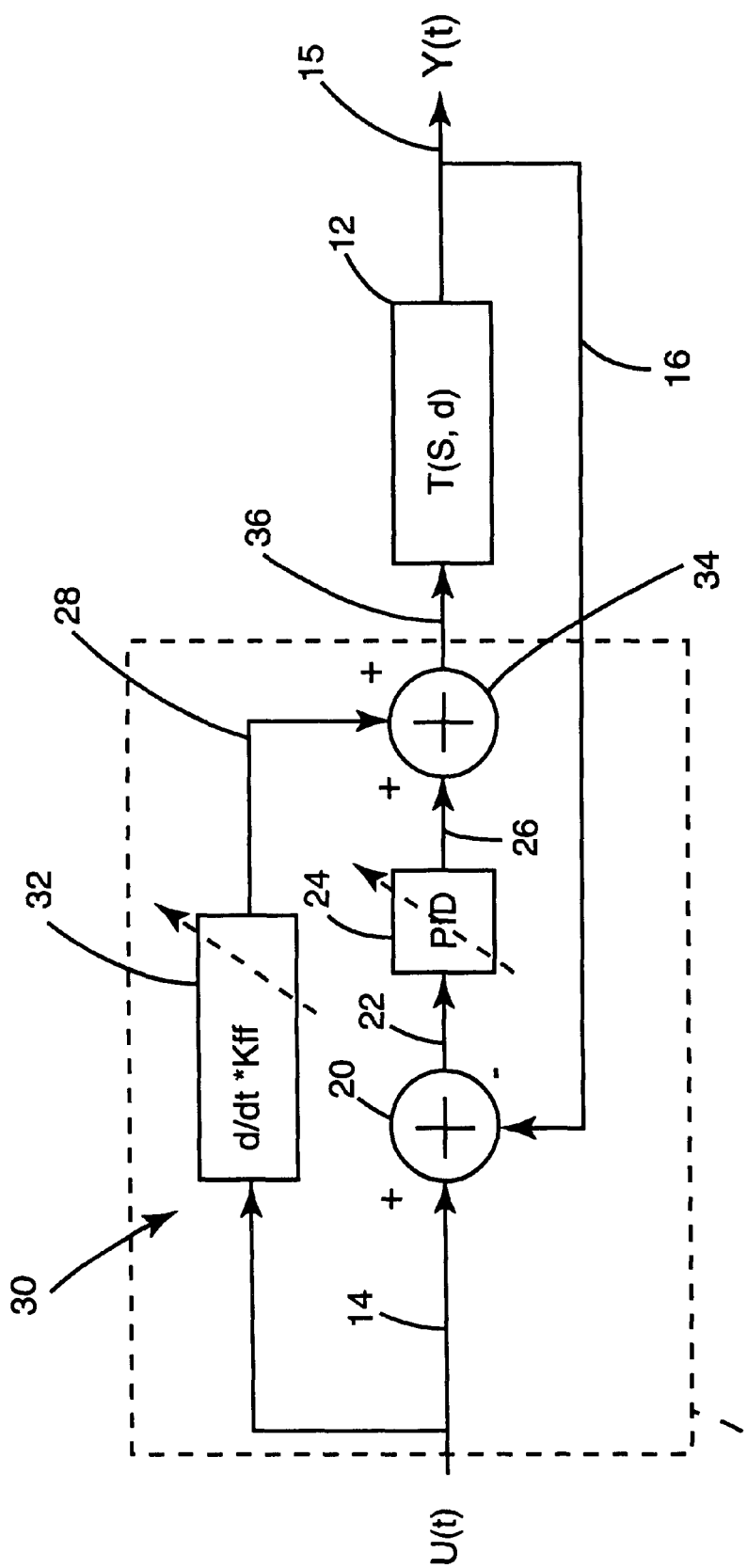
FIG. 1 is a block diagram of a typical prior art system control used to illustrate the problem.

FIG. 1 illustrates a block diagram of a typical prior art system controller 10 for a system 12 having an inherent delay. A request or command input is provided at 14, while a feedback signal of an output 15 of the system 12 is provided at 16. As appreciated by those skilled in the art, the feedback 16 is generally proportional to the output 15 of the system 12, that being some controlled parameter. Typically, a sensor (not shown) provides the feedback 16 and is operably coupled to measure the output 15 of the system 12.

As is generally known, the command input 14 and the feedback 16 are summed or combined by a summer 20. The output of the summer 20 is an error 22 that is provided as an input to a compensator 24 (herein exemplified as a proportional-integral-derivative compensator). The compensator 24 typically includes an integrator component (not explicitly shown), which provides an output as long as an error 22 exists. However, in an attempt to minimize integral windup, it is known to combine the output 26 from the compensator 24 with a signal 28 that is the derivative of the command input 14. In FIG. 1, this is illustrated by branch 30 where a derivative module 32 receives the command input 14 and provides the signal 28 to a summer 34. The summer 34 combines the signal 28 with the output 26 from the compensator 24 in order to form an input 36 for the system 12.

Although the derivative module 32 (functioning as a feed-forward branch) attempts to minimize integral windup, the derivative signal 28 cannot be used effectively since 100 percent feed-forward may increase the overshoot of most tightly tuned systems. In other words, assuming no external disturbance upon the system 12, a 100 percent derivative signal 28 should cause the output of the system 12 to be at the desired state or level after some delay. Nevertheless, since the feedback loop portion of traditional system controllers continuously generates an error 22 by comparing the instantaneous command input 14 and feedback 16, the signal 36 provided to the system 12 is not only the function of the external disturbance or inadequate tuning, but also is a function of latency of the system 12 to the input command 14. This "overcompensation" thereby results in possible overshoot in most tightly tuned systems.

Figure 2A:
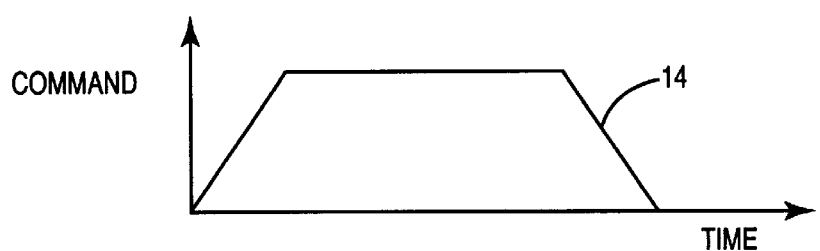
Figure 2B:
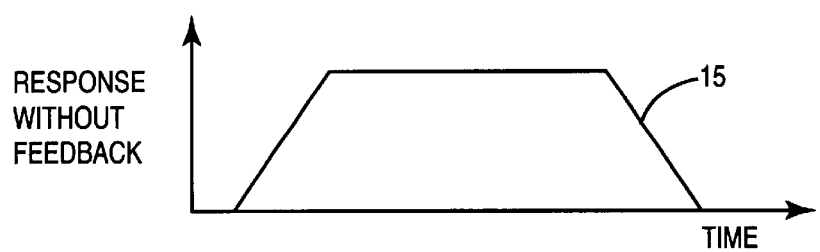
Figure 2A:
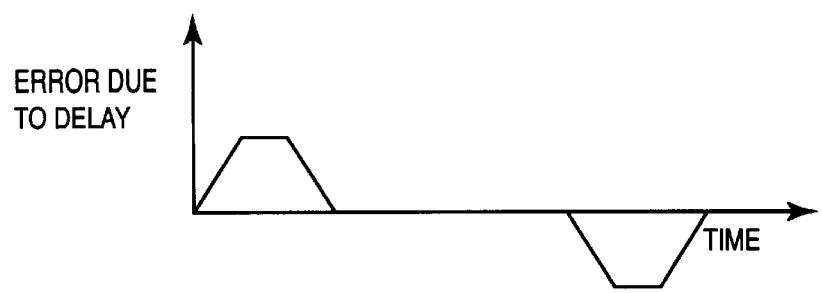

FIGS. 2A, 2B and 2C illustrate, graphically, the input command 14, a response of the system 12 without feedback, and the error due to the inherent delay, respectively.

Figure 3:
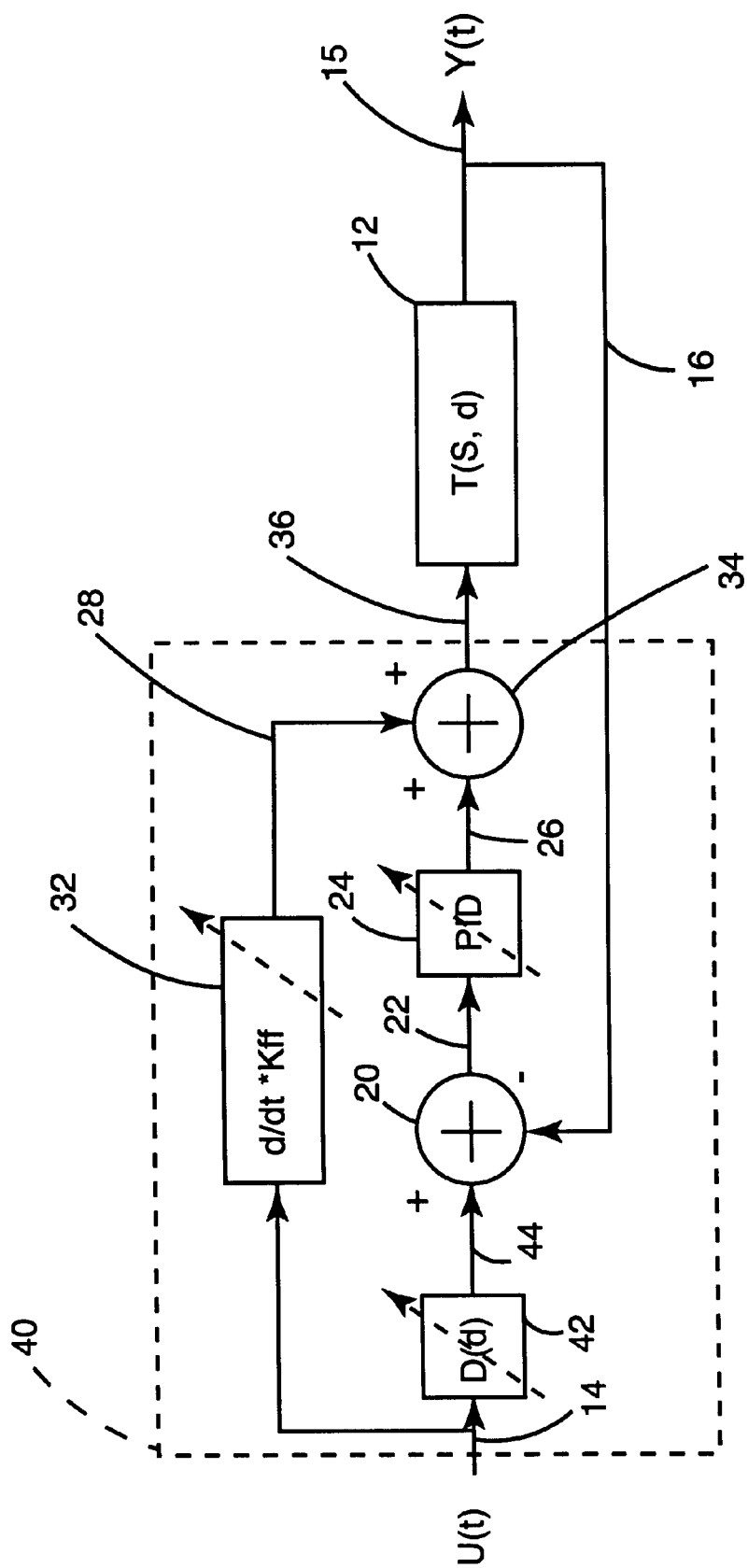
FIG. 3 is a block diagram of an embodiment of a system controller the present invention.

FIG. 3 illustrates an embodiment of the present invention to improve the system controller of the prior art and reduce overshoot tendencies. In FIG. 3, modules and signal lines having the same reference number as modules and signal lines in FIG. 1 serve identical functions as the like numbered modules and signal lines in FIG. 1.

Generally, a system controller 40 further includes a delay module 42 that receives the command input 14 and provides an output 44 to summer 20. The output 44 generally corresponds to the command input 14, but is delayed in time, as illustrated in FIG. 4A. The delay module 42 allows the feed-forward output 28 from derivative module 32 to produce the desired output 15 from system 12 wherein a closed-loop portion (feedback 16, summer 20 and compensator 24) compensates generally for only external disturbances and steady-state errors. This is further illustrated in FIGS. 4B and 4C where a response without feedback is provided in FIG. 4B, while the error (substantially none) without external disturbances is illustrated in FIG. 4C.

Although illustrated with the feed-forward branch 30 comprising a derivative module, other feed-forward implementations can benefit from the present invention. For example, the feed-forward branch 30 can comprise an inverse transfer function of the controllable system 12.

Generally, the delay provided by delay module 42 is on the order of the inherent delay (the difference between FIGS. 2A and 2B) of the system 12. Experimentation in the amount of delay may be necessary to optimize performance. A gain factor (K) of the derivative module 32 is a function of the impedance of the system 12 (i.e. resistance of the system 12 to change) and is dependent upon each application although it can be calculated or experimentally determined as is known in the art.

Those skilled in the art will appreciate that the modules and elements forming the block diagram of FIG. 3 can be implemented in hardware, software or combinations thereof. For instance, analog circuits or components can be used to process analog signals. As an example, the delay module 42 can be implemented using a static or adjustable filter, while the derivative module 32 and the compensator 24 can be implemented using known operational amplifier circuits. If desired, some or all of the modules in FIG. 3 can be implemented with discrete digital logic components or circuits.

At this point, it should also be noted that the compensator 24 can take any one of multiple forms. Generally, the compensator 24 includes an integrator component, such as present in a proportional-integral (PI) compensator, or a proportional-integral-derivative (PID) compensator, as illustrated. Generally, any closed loop control system with the feed-forward branch 30 can benefit from the presence of delay module 42 when used to control a system 12 with an inherent delay.

Figure 5:
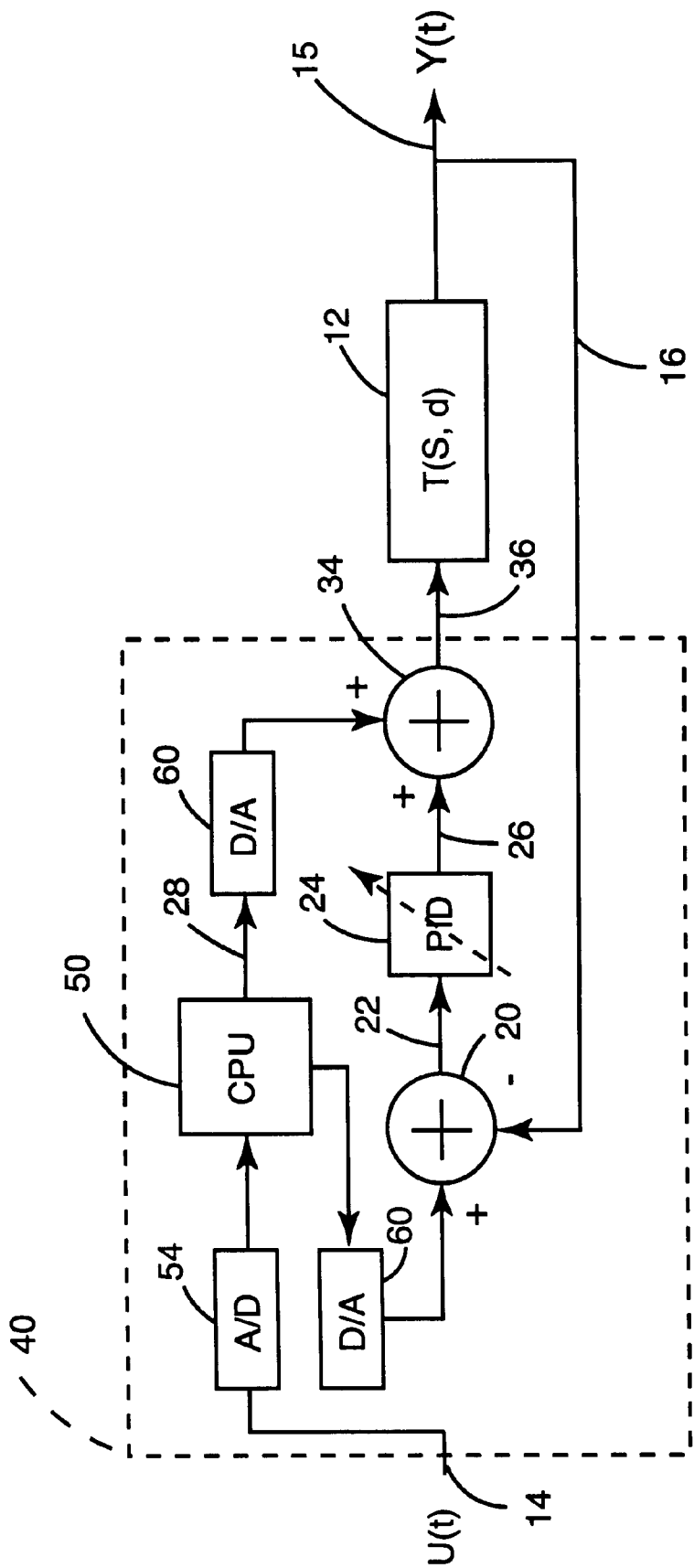
FIG. 5 is a block diagram of a first digital embodiment of the present invention.

A first digital embodiment is illustrated in FIG. 5. In FIG. 5, circuit elements having the same numbers as used in FIG. 3 serve identical functions. The principle difference between the embodiments illustrated in FIGS. 3 and 5 is that in FIG. 5 a processor performs the derivative and time delay functions of modules 32 and 42. Analog-to-digital converter 54 converts input command 14 for the processor 50, while outputs (derivative feed-forward 28 and delayed command input 44) from the processor 50 are converted back to analog form with digital-to-analog converters 60.

Figure 6:
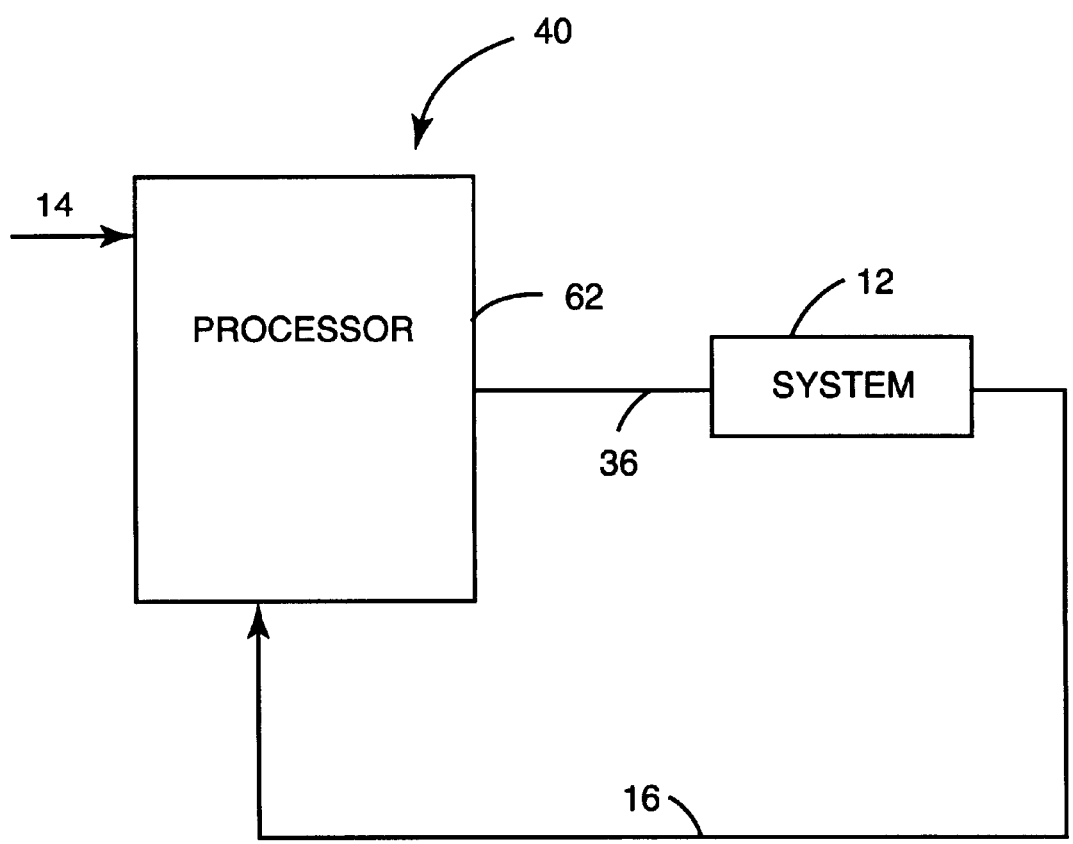
FIG. 6 is a block diagram of a second digital embodiment of the present invention.

It should be further understood that all functions of the controller system 40 can be implemented by a suitable processor, such as a digital signal processor, as illustrated in FIG. 6. In this embodiment, a processor 62 receives the command input 14 and the feedback 16, and provides the input 36 for the system 12. In other words, processor 62 executes routines or programs to perform each of the functions illustrated in FIG. 4. As appreciated by those skilled in the art, the processor 62 accesses suitable memory such as RAM, ROM, EPROM, or other suitable storage devices including hard disks, optical drives or the like, to execute the routines, process data and generate the input 36 for the system 12.

Figure 7:
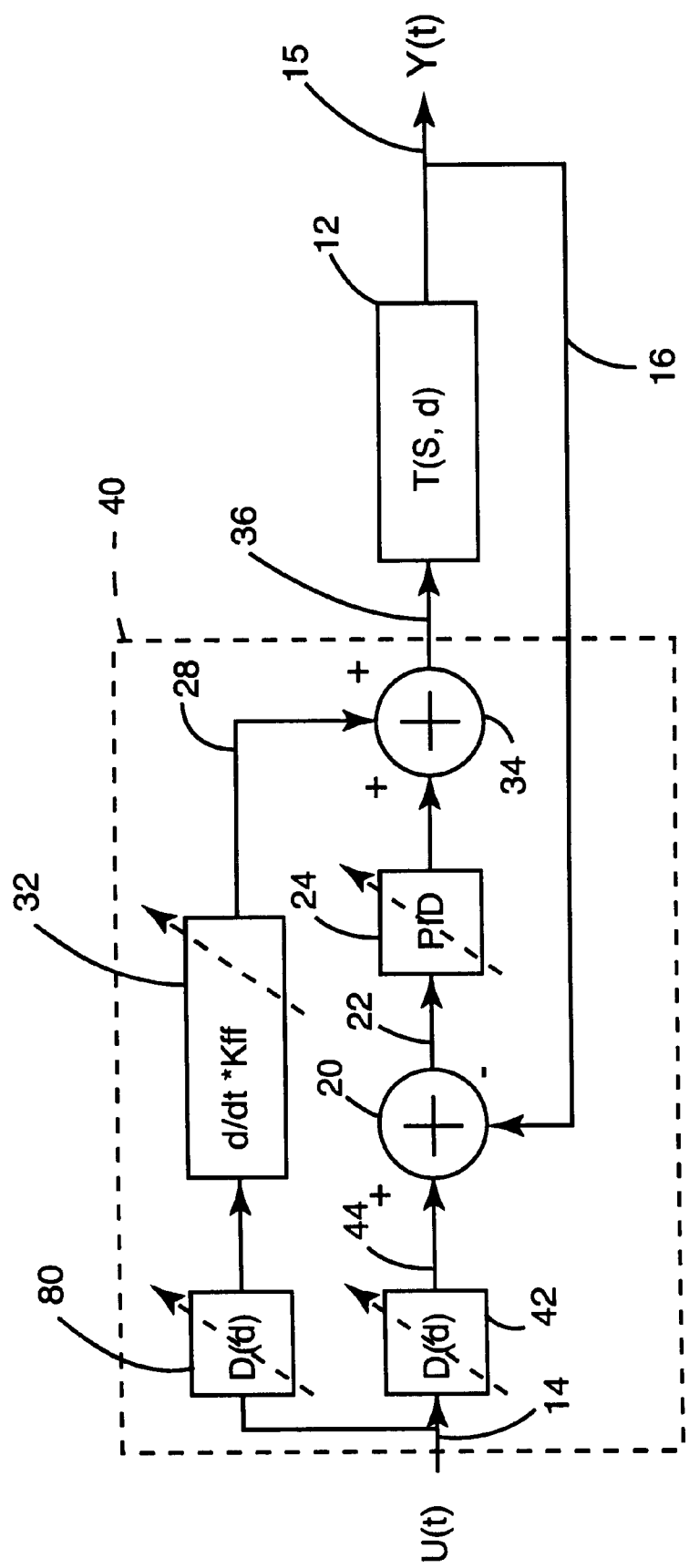
FIG. 7 is a block diagram of a further embodiment of the present invention.

FIG. 7 illustrates a further embodiment of the present invention. In FIG. 7, modules having the same numbers as corresponding modules in FIG. 3 serve identical functions. The principle difference between the embodiments illustrated in FIGS. 7 and 3 is that in FIG. 7, an additional delay module is provided at 70. The delay module 70 receives the command input 14, and provides as an output 72, generally the command input 14 for the derivative module 42, however, delayed in time. The delay module 70 may be necessary or preferred, in applications where the amount of delay due to delay module 42 is excessive.

Figure 8:
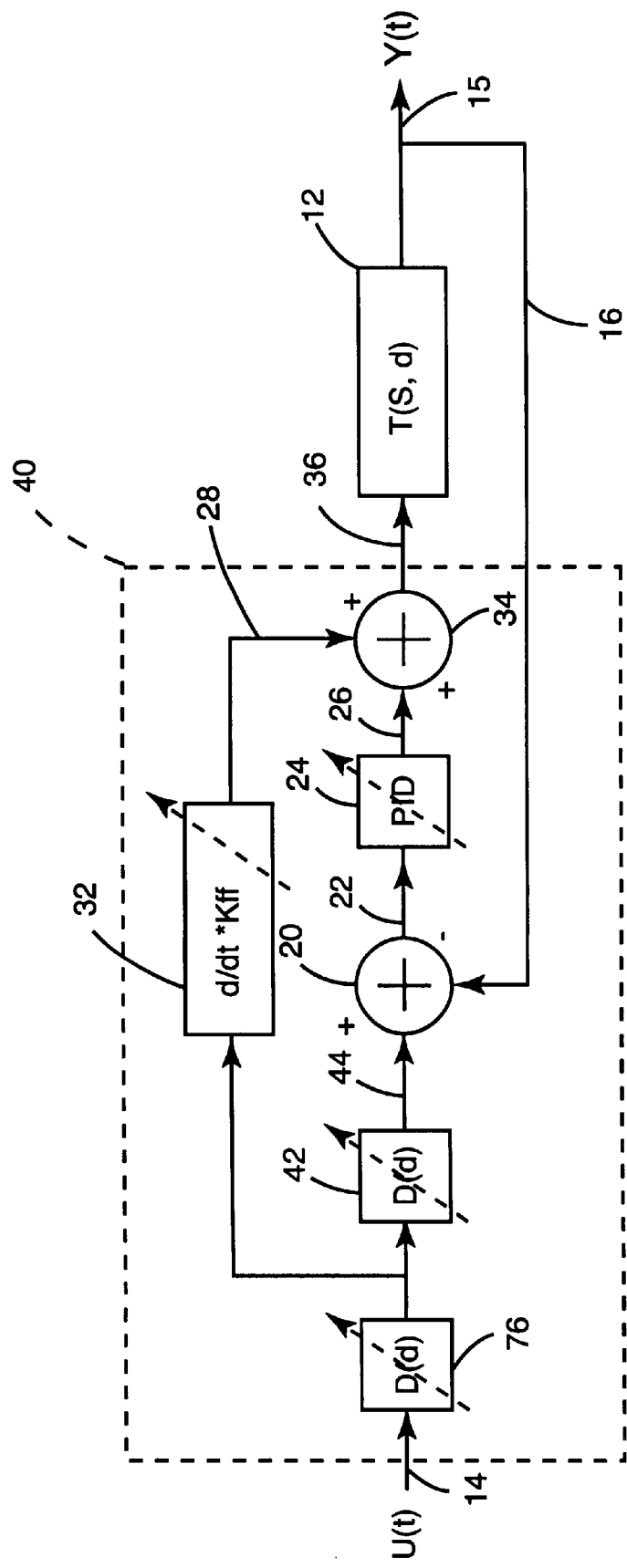
FIG. 8 is a block diagram of another embodiment of the present invention.

FIG. 8 illustrates a further embodiment where a delay module 76 is provided in the command input 14 path, without providing the separate delay module for the feed-forward branch 30, as illustrated in FIG. 7. Those skilled in the art will appreciate that the embodiment of FIG. 8, given the description above, is structurally equivalent to the embodiment of FIG. 8.

Figure 9:
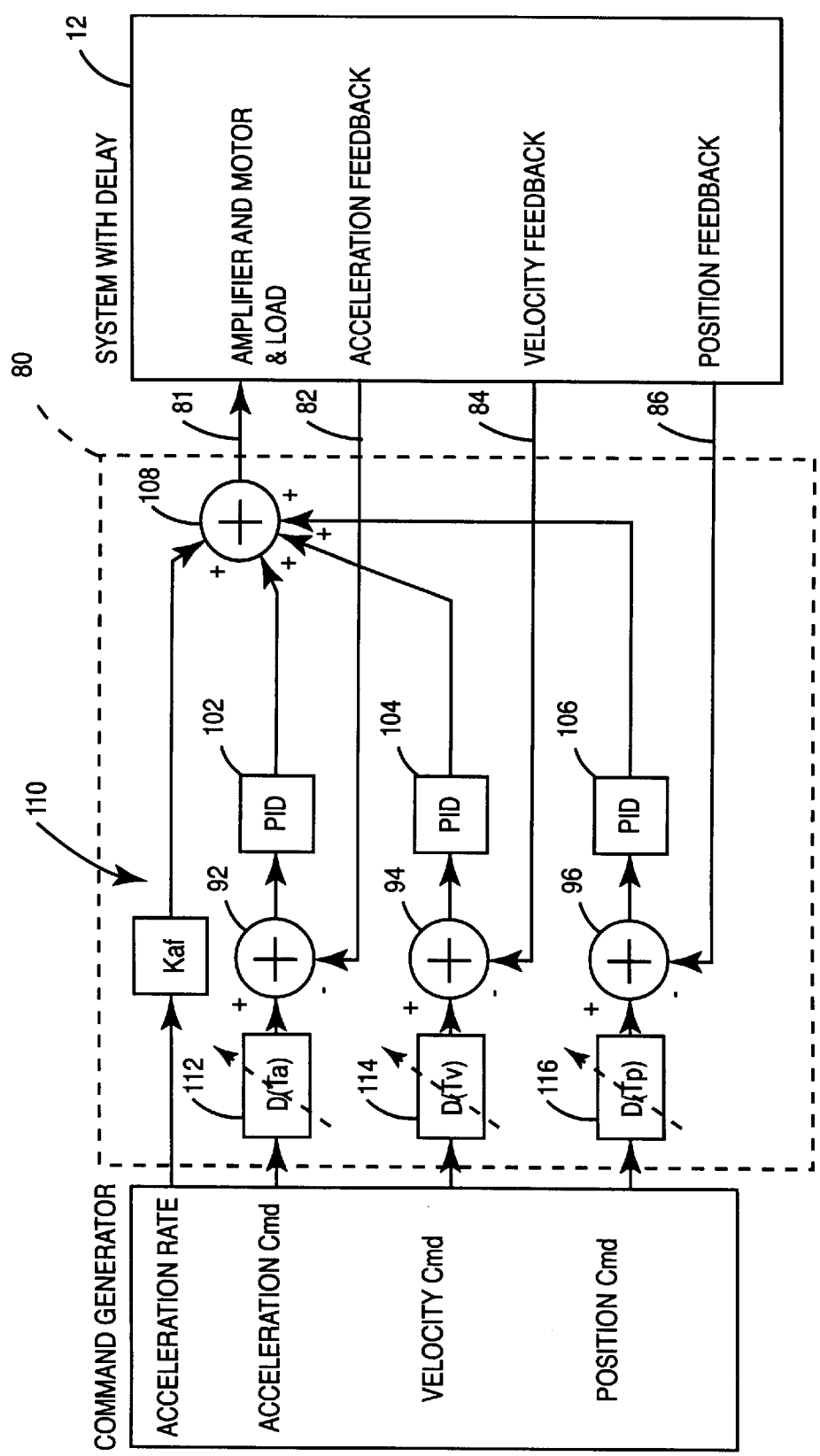
FIG. 9 is a block diagram of a multi-loop system controller of the present invention.

FIG. 9 illustrates a multi-loop system controller 80 of the present invention. In the embodiment illustrated, the multi-loop controller 80 provides a command input 81 to a system 12 comprising an amplifier, an electric motor and a load being driven by the electric motor. Commonly, as is known to those skilled in the art feedback signals can include acceleration feedback 82, a velocity feedback 84 and a position feedback 86 of a rotor of the electric motor. Typically, the velocity feedback 84 and the position feedback 86 are provided from a suitable sensor such as an encoder, resolver or the like, as well known to those skilled in the art. Likewise, as also well known to those skilled in the art, the acceleration feedback 82 can be calculated from the output signal providing the velocity feedback 84 or position feedback 86, or from a current sensor or a plurality of current sensors that monitor the current provided to the motor.

Each of the feedback signals 82, 84 and 86 are provided to corresponding summers 92, 94 and 96. Each summer 92, 94 and 96 forms part of a closed-loop controller section that includes separate compensators 102, 104 and 106. The outputs from compensators 102, 104 and 106 are combined with a summer 108 and a derivative signal provided from a feed-forward branch 110 (similar to branch 30) in order to provide the command input 81 to the system 12. In this embodiment, separate, adjustable delay modules 112, 114 and 116 are provided for each of the command signals as illustrated. As appreciated by those skilled in the art, any of the teachings of FIGS. 6–8 can be incorporated into the embodiment of FIG. 9.

Although the present invention has been described with reference to preferred embodiments, workers skilled in the art will recognize that changes may be made in form and detail without departing from the spirit and scope of the invention.

What is claimed is:

1. A system controller for a controllable system having an inherent time delay, the system controller comprising:
   a delay module receiving a command input and providing a first output signal delayed in time from the command input;
   a feed-forward module receiving a function of the command input and providing a second output signal that drives the controllable system to a desired state;
   a first summer receiving the delayed first output signal and a feedback signal from the controllable system, the first summer combining the first output signal and the feedback signal to provide a third output signal;

a compensator module receiving the third output signal and providing a fourth output signal; and a second summer receiving the second output signal and the fourth output signal, the second summer combining the second output signal and the fourth output signal to provide an input signal for the controllable system.

2. The system controller of claim 1 wherein the feed-forward module comprises a derivative module.

3. The system controller of claim 1 wherein the feed-forward module comprises an inverse transfer function of the controllable system.

4. The system controller of claim 1 wherein the compensator module is a proportional-integral compensator module.

5. The system controller of claim 1 wherein the compensator module is a proportional-integral-derlvative compensator module.

6. The system controller of claim 1 and further comprising a second delay module receiving the command input and providing a fifth output signal delayed in time from the command input, and wherein the feed-forward module receives the fifth output.

7. The system controller of claim 1 wherein the delay module, feed-forward module, the first summer, the compensator module and the second summer comprise hardware components.

8. The system controller of claim 1 and further comprising a processor wherein the delay module, feed-forward module, the first summer, the compensator module and the second summer comprise software modules operable on the processor.

9. The system controller of claim 1 and further comprising a processor, and wherein at least one of the delay module, feed-forward module, the first summer, the compensator module and the second summer comprise a a software module operable on the processor.

10. The system controller of claim 1 wherein the delay module is adjustable.

11. The system controller of claim 1 and further comprising a second delay module receiving the command input and providing a fifth output signal delayed in time from the command input, and wherein the feed-forward module and the first delay module receives the fifth output.

12. A system controller for a controllable system having an inherent time delay, the system controller comprising:

delay means, receiving a command input, for outputting a first output signal delayed in time from the command input;

feed-forward means, receiving a function of the command input, for outputting a second output signal that produces a desired response in the system;

first summing means, receiving the first output signal and a feedback signal from the controllable system, for combining the first output signal and the feedback signal to provide a third output signal;

compensator means, receiving the third output signal, and outputting a fourth output signal; and second summer means, receiving the second output signal and the fourth output signal, for combining the second output signal and the fourth output signal to provide an input signal for the controllable system.

13. The system controller of claim 1 wherein the feed-forward means comprises a derivative module and the second output signal comprises a derivative of the command input.

14. A motor controller for an electric motor, the motor controller comprising:

a delay module receiving a command input and providing a first output signal delayed in time from the command input;

a derivative module receiving a function of the command input and providing a second output signal that is a derivative of the command input;

a first summer receiving the first output signal and a feedback signal from the electric motor, the first summer combining the first output signal and the feedback signal to provide a third output signal;

a compensator module receiving the third output signal and providing a fourth output signal; and a second summer receiving the second output signal and the fourth output signal, the second summer combining the second output signal and the fourth output signal to provide an input signal for the electric motor.

15. The motor controller of claim 14 wherein the feedback signal comprises at least one of a position of a rotor of the motor, a velocity of the rotor and an acceleration of the rotor.

16. The motor controller of claim 14 and further comprising:

a second delay module receiving a second command input and providing a fifth output signal delayed in time from the second command input, wherein the command input and the second command input are chosen from a group consisting of an acceleration command, a velocity command and a position command;

a third summer receiving the fifth output and a second feedback signal from the electric motor, the third summer combining the fifth output signal and the second feedback signal to provide a sixth output signal, where the feedback signal and the second feedback signal are chosen from the group consisting of a position of a rotor of the motor, a velocity of the rotor, and an acceleration of the rotor;

a second compensator module receiving the sixth output signal and providing a seventh output signal; and where the second summer receives the second output signal, the fourth output signal, and the seventh output signal, the second summer combining the second output signal, the fourth output signal and the seventh output signal to provide an input signal for the motor.

* * * * *

UNITED STATES PATENT AND TRADEMARK OFFICE
CERTIFICATE OF CORRECTION

PATENT NO. : 6,308,106 B1
DATED : October 23, 2001
INVENTOR(S) : Masoud et al.

It is certified that error appears in the above-identified patent and that said Letters Patent is hereby corrected as shown below:

Column 4,
Line 64, delete "delayed".

Column 5,
Line 34, delete "a", second instance.

Column 6,
Line 41, after "output" insert -- signal --.

Signed and Sealed this

Fifteenth Day of June, 2004

JON W. DUDAS
*Acting Director of the United States Patent and Trademark Office*